(12) United States Patent
Mathews et al.

(10) Patent No.: US 9,870,070 B2
(45) Date of Patent: *Jan. 16, 2018

(54) HAND HELD POINTING DEVICE WITH ROLL COMPENSATION

(71) Applicant: MOVEA SA, Grenoble (FR)

(72) Inventors: Michael Mathews, Gilroy, CA (US); Walter M. Mason, San Jose, CA (US)

(73) Assignee: Movea SA, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,141

(22) Filed: Jan. 27, 2016

(65) Prior Publication Data

US 2016/0139687 A1 May 19, 2016

Related U.S. Application Data

(63) Continuation of application No. 13/732,748, filed on Jan. 2, 2013, which is a continuation of application No. 13/112,742, filed on May 20, 2011, now Pat. No. 8,442,798, which is a continuation of application No. 12/147,811, filed on Jun. 27, 2008, now Pat. No. 8,010,313.

(51) Int. Cl.
  *G01P 15/00* (2006.01)
  *G06F 3/033* (2013.01)
  *G06F 3/0346* (2013.01)
  *G06F 3/038* (2013.01)

(52) U.S. Cl.
  CPC .......... *G06F 3/0346* (2013.01); *G06F 3/0383* (2013.01)

(58) Field of Classification Search
  CPC .............................. G06F 3/0346; G06F 3/0383

USPC ............ 702/141, 33–36, 41, 81, 84–85, 92, 702/94–97, 127, 142, 145–147, 149–153, 702/155, 157–158, 179, 182–183, 702/188–189, 198–199; 345/156–159, 345/163; 73/1.37, 1.75, 1.79; 33/574, 33/579; 340/500, 540, 669–671
See application file for complete search history.

(56) References Cited

U.S. PATENT DOCUMENTS

| 5,181,181 A | 1/1993 | Glynn |
| 5,440,326 A | 8/1995 | Quinn |
| 5,453,758 A | 9/1995 | Sato |
| 5,898,421 A | 4/1999 | Quinn |

(Continued)

FOREIGN PATENT DOCUMENTS

| WO | 2007007227 | 1/2007 |
| WO | 2009156476 | 12/2009 |

OTHER PUBLICATIONS

Calibration and Data Fusion Solution for the Miniature Attitude and Heading Reference System, Turman et al., Sensors and Actuators A 138 (2007), pp. 41 1-420.

(Continued)

*Primary Examiner* — Nelson Rosario
(74) *Attorney, Agent, or Firm* — Dergosits & Noah LLP

(57) ABSTRACT

A pointing device includes accelerometers and rotational sensors that are coupled to a processor. The processor samples the accelerometers and rotational sensors to detect gravity and pointing device motion and uses algebraic algorithms to calculate roll compensated cursor control signals. The processor transmits the cursor control signals to a receiver that is coupled to an electronic device that moves the cursor on the visual display.

4 Claims, 6 Drawing Sheets

(56) References Cited

U.S. PATENT DOCUMENTS

| | | | |
|---|---|---|---|
| 5,902,968 | A | 5/1999 | Sato et al. |
| 6,634,207 | B1 | 10/2003 | Lottman et al. |
| 7,031,875 | B2 | 4/2006 | Ellenby et al. |
| 7,041,916 | B2 | 5/2006 | Paul et al. |
| 7,158,118 | B2 | 1/2007 | Liberty |
| 7,236,156 | B2 | 6/2007 | Liberty et al. |
| 7,239,301 | B2 | 7/2007 | Liberty et al. |
| 7,262,760 | B2 | 8/2007 | Liberty |
| 8,010,313 | B2 | 8/2011 | Matthews et al. |
| 2003/0158699 | A1 | 8/2003 | Townsend et al. |
| 2004/0078194 | A1 | 4/2004 | Liljeryd et al. |
| 2005/0243062 | A1* | 11/2005 | Liberty ............ G06F 3/017 345/158 |
| 2007/0131029 | A1* | 6/2007 | Tsai ............ A63F 13/10 73/488 |
| 2007/0132733 | A1 | 6/2007 | Ram |
| 2007/0146325 | A1* | 6/2007 | Poston ............ G06F 3/0317 345/163 |
| 2008/0134784 | A1 | 6/2008 | Jeng |
| 2008/0174550 | A1 | 7/2008 | Laurila et al. |
| 2008/0204404 | A1* | 8/2008 | Kneissler ............ G06F 3/0317 345/156 |
| 2008/0291163 | A1* | 11/2008 | Liberty ............ G06F 3/017 345/156 |
| 2009/0167723 | A1 | 7/2009 | Kwong et al. |
| 2010/0321291 | A1 | 12/2010 | Kabasawa et al. |
| 2012/0274560 | A1 | 11/2012 | Caritu et al. |

OTHER PUBLICATIONS

Handbook of Mathematics, I.N. Bronshtein, KA Semedyayev, Section 2.5.2, Transcendental functions, pp. 161-172.
IEEEXplore Digital Library—"Why Computer Architecture Matters", Computing in Science and Engineering, May/Jun. 2008, pp. 1-2.
Keith Lorenzo Haynes, "Computer Graphics Tolls for the Visualization of Spacecraft Dynamics", Master's Thesis, Naval Postgraduate School, Dec. 15, 1993,14 pages.
Ken Turkowski, "The Use of Coordinate Frames in Computer Graphics", 1999, Academic Press Inc. pp. 522-532.
List of Trigonometric Identities, Wikipedia, Dec. 28, 2007, pp. 1-14.
Tom Chen et al., "Development of a Stereoscopic Haptic Acoustic Real-Time Computer (SHARC)", 1998, SPIE, vol. 3295, pp. 967-989.
"Vector Methods to Compute Azimuth, Elevation, Ellipsoidal Normal, and the Cartesian (X, Y, Z) to geodetic (0,A,h) transformation, Feltens, J Geod (2008) 82, pp. 493-504".
Wayne H. Wolfe, "Hardware-Software Co-Design of Embedded Systems", Proceedings of the IEEE, vol. 82, No. 7 Jul. 1994, pp. 967-989.
Wei Tech Ang, "Active Tremor Compensation in Handheld Instrument for Microsurgery", Thesis, the Robotics Institute, Carnegie Mellon University, May 2004, 26 pages.
Why Computer Architecture Matters, Cosmin Pancratov et al., Computing in Science and Engineering, IEEE, May|Jun. 2008, pp. 59-63.
European Patent Office Communication, EP Application No. 09769324.6, Sep. 11, 2012.
International Search Report and Written Opinion for International Application No. PCT/EP2009/057978.
Office Action for U.S. Appl. No. 12/147,811; dated Sep. 23, 2010.
Office Action for U.S. Appl. No. 13/112,742; dated Jul. 13, 2012.
Office Action for U.S. Appl. No. 13/723,748; dated Dec. 23, 2014.
Office Action for U.S. Appl. No. 13/723,748; dated Jul. 28, 2015.
Reexam Application 95/000,645 Office Action, dated Jul. 13, 2012.
Reexam Application 95/000,645 Office Action, dated Mar. 17, 2015.
Reexam Application 95/000,645 Office Action, dated Dec. 30, 2011.
Reexam Application 95/000,645 Requestor Comments Dated Mar. 30, 2012.
Third Party Observation Concerning European Patent Application No. 09769324.6, dated Apr. 28, 2011.

* cited by examiner

HAND HELD POINTING DEVICE WITH ROLL COMPENSATION

CROSS REFERENCE TO RELATED APPLICATION

This patent application is a continuation of U.S. patent application Ser. No. 13/732,748, "Hand Held Pointing Device With Roll Compensation," filed Jan. 2, 2013, which is a continuation of U.S. patent application Ser. No. 13/112,742, "Hand Held Pointing Device With Roll Compensation," filed May 20, 2011, which is a continuation of U.S. patent application Ser. No. 12/147,811, "Hand Held Pointing Device With Roll Compensation," filed Jun. 27, 2008. U.S. patent application Ser. Nos. 13/732,748, 13/112,742 and 12/147,811 are hereby incorporated by reference in their entirety.

BACKGROUND

Pointing devices allow users to move a curser or other indicators on a computer display in response to the user's movement. A normal computer mouse pointing device converts horizontal movement over a planar surface in two dimensions into corresponding curser movement on a computer screen. The mouse includes a sensor that is typically a laser or roller ball sensor that detects movement over a surface.

Other types of pointing devices have been designed which operate in three dimensional space and do not require the detection of movement over a surface. Motion detecting mechanisms include gyroscopes that detect rotational movement of the pointing device and accelerometers that detect linear movement. The gyroscopes and accelerometers emit signals that correspond to the movements of the pointing device and are used to control the movement of a cursor on the computer screen. A problem with existing three dimensional pointing devices is that if the user naturally holds the device at an angle offset from horizontal, the movement of the pointing device results in a cursor movement that is offset by roll angle, i.e., horizontal movement of the pointing device held at a roll angle results in angled movement of the cursor on the computer screen.

Some pointing devices are able to provide roll compensation for the natural hand position of the user. However, a problem with existing roll compensated pointing devices is that they utilize a very complex trigonometric matrix algorithm which requires high powered processors that draw a significant amount of electrical power. Since the pointing device is preferably a cordless device, the portable batteries used to operate the more powerful processor may require frequent recharging or replacement.

What is needed is an improved pointing device that performs roll compensation in a more energy efficient manner so that an inexpensive low powered processor can be used and battery live can be substantially improved.

SUMMARY OF THE INVENTION

The present invention is directed towards a three dimensional pointing device that uses a low powered processor to calculate an algebraic roll compensation algorithm using data from accelerometers and rotational sensors. The inventive pointing device is less expensive to produce and much more energy efficient than the prior art. The pointing device has a transverse X axis that extends across the width of the pointing device, a Y axis that extends along the center axis of the pointing device, and a vertical Z axis that extends up from the center of the pointing device. In order to detect movement, the pointing device includes accelerometers which detect gravity and acceleration in the X, Y, and Z directions and gyroscopes which measure the rotational velocity of the pointing device about the X axis in pitch and the Z axis in yaw.

The accelerometers and gyroscopes are coupled to a microprocessor that converts the accelerometer and gyroscope signals into roll compensated cursor control signals that are used to move a cursor on a display screen that is coupled to an electronic device. The pointing device can also include one or more buttons and a scroll wheel which can also be used to interact with a software user interface. The pointing device can have a transmitter system so the pointing device output signals can be transmitted to an electronic device through a wireless interface such as radio frequency or infrared optical signals. The user can use the pointing device to control software by moving the cursor to a target location on the computer screen by moving the inventive pointing device vertically and horizontally in a three dimensional space. The user can then actuate controls on the visual display by clicking a button on the pointing device or rolling the scroll wheel.

If the pointing device is held stationary in a purely horizontal orientation, the vertical Z direction accelerometer would sense all of the gravitational force and the horizontal X and Y direction accelerometers would not detect any gravitational force. However, since the pointing device is generally held by the user with some roll, portions of the gravitational force are detected by the X, Y and Z direction accelerometers. To perform roll compensation, the pointing device dynamically detects the natural roll of the user's hand position based upon the X, Y and Z direction accelerometers signals and continuously updates the roll adjusted cursor control output signals. The roll correction factors Xcomp and Ycomp for horizontal and vertical movements of the inventive pointing device are represented by the algebraic algorithms:

$$X_{comp}=[A_z*R_x+A_x*R_x]/A_{XZ}$$

$$Y_{comp}=[A_x*R_x-A_z*R_z]/A_{XZ}$$

Where, $A_x$ is the acceleration in the X direction and $A_z$ is the acceleration in the Z. $A_{XZ}$ is the vector sum of $A_X$ and $A_Z$, solved by the equation, $A_{XZ}=[A_X^2+A_Z^2]^{1/2}$ where Rx is the rotational pitch velocity about the X axis and Rz is the rotational yaw velocity about the Z axis. Because the system dynamically detects roll, the inventive system continuously updates the roll compensation and automatically adjusts to the hand roll of any user.

In embodiments of the inventive pointing device, additional calculations are performed to provide compensation to the cursor movement $X_{comp}$ and $Y_{comp}$ for the pitch movement of the pointing device, user induced acceleration, and variations in the temperature of the pointing device. As the pointing device is rotated in pitch, the Z axis gyroscope is angled away from a vertical orientation. This decreases the detection of rotational velocity about the Z axis and reduces the $X_{comp}$ value. In an embodiment, the pointing device detects the pitch angle and increases the correction factors $X_{comp}$ to compensate for the pitch angle.

User induced acceleration is caused by the offset positions of the accelerometers from the center of rotation of the pointing device. As the user moves the pointing device, the accelerometers detect rotational movement of the pointing device. In an embodiment, the system calculates the rotational acceleration at the accelerometers and adjusts the accelerometer output signals to compensate for the rotational acceleration. In another embodiment, the system calculates the centripetal acceleration at the accelerometers and adjusts the accelerometer signals accordingly. By removing the user induced rotational accelerations, the gravitational component of the accelerometer signals can be isolated to accurately detect the roll of the pointing device.

Temperature compensation may be required where motion sensor outputs are altered by variations in temperature. Temperature compensation is performed by detecting changes in the temperature of the pointing device and applying a corrective factor to the motion sensor signals if a change in temperature is detected. In an embodiment, the pointing device includes a temperature transducer that periodically detects the temperature. If a substantial change in temperature is detected, temperature correction factors are applied to the rotational sensors outputs.

Since the roll correction and other compensation equations use very simple algebraic algorithms, a basic processor that requires very little electrical energy can be used in the inventive pointing device. In an embodiment, the processor is a 16 bit RISC (Reduced Instruction Set Computer) processor that operates at about 4 MHz. Under these operating conditions, the batteries used to power the processor of the inventive pointing device may last for several months of service. This is a significant improvement over a pointing device that uses a trigonometry or matrix based roll compensating algorithm that requires a more powerful processor operating at 12-16 MHz and consuming much more energy.

DETAILED DESCRIPTION

Figure 1:
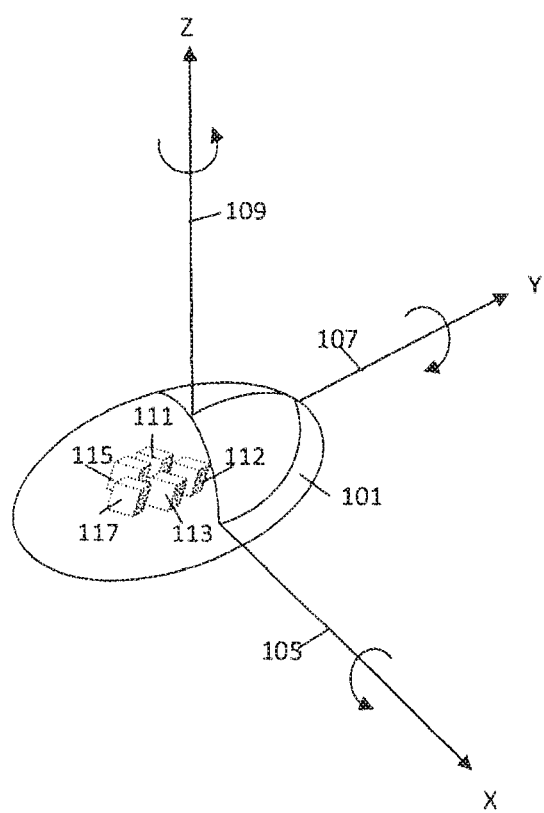
FIG. 1 illustrates a pointing device in an X, Y, Z coordinate system.

With reference to FIG. 1, an embodiment of a hand held motion sensing pointing device 101 is illustrated. The pointing device 101 moves within a three dimensional Cartesian coordinate system defined by the X, Y and Z axes which are perpendicular to each other. The center point of the X, Y and Z coordinate system is the center of rotation of the pointing device 101. The X axis 105 extends across the width of the pointing device 101, the Y axis 107 extending along the center axis and the Z axis 109 extending up from the center of the pointing device 101. The frame of reference for the pointing device 101 is known as the "body frame of reference."

The pointing device 101 may include X, Y and Z direction accelerometers 111, 112, 113 that are each mounted orthogonal to each other and detect acceleration and gravity in the X, Y and Z directions. The X, Y and Z direction accelerometers output the acceleration values, AX, AY and AZ that correspond to each directional component of acceleration for the pointing device 101. The total acceleration is the vector sum AXYZ of AX, AY and AZ, which is represented by the equation $AXYZ=[AX2+AY2+AZ2]^{1/2}$.

The pointing device 101 also includes an X axis gyroscope 115 and Z axis gyroscope 117 that measure the rotational velocity. The X axis gyroscope 115 detects the rotational velocity of the pointing device 101 in pitch about the X axis 105 and a Z axis gyroscope 117 detects the rotational velocity yaw about the Z axis 109.

When a user moves the pointing device 101, the movement is generally a combination of translation detected by the accelerometers 111, 112, 113 and the rotation is detected by the X axis and Z axis gyroscopes 115, 1179. Because the hand, wrist and arm move about joints, vertical movement of the pointing device will cause a rotational velocity about the X axis 105 and horizontal movement will cause rotational velocity about the Z axis 109.

Figure 2:
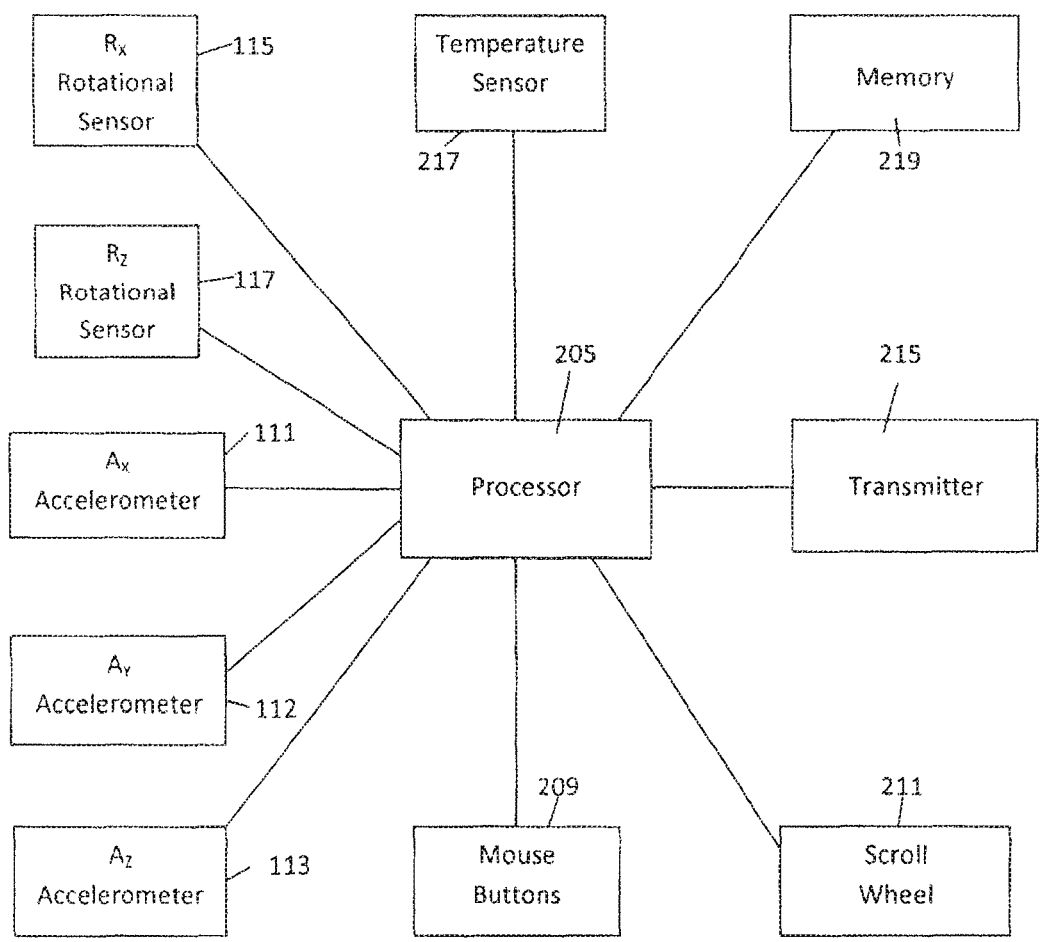
FIG. 2 illustrates a block diagram of the inventive pointing device.

With reference to FIG. 2, a block diagram of the inventive pointing device components is illustrated. The X, Y and Z accelerometers 111, 112, 113 and the X axis and Z axis rotation sensors 115, 117 are coupled to the processor 205. In addition to the acceleration and rotation sensors, a temperature sensor 217 may be coupled to the processor 205 which is used to perform temperature signal corrections which will be discussed later. Additional input devices may be coupled to the processor 205 including: mouse buttons 209 and a scroll wheel 211. The processor 205 may also perform additional signal processing including, calibration, conversion, filtering etc. The processor 205 performs the roll compensation for the pointing device in a manner described below and produces corrected cursor control signals that are forwarded with button/scroll wheel signals to a transmitter 215 that sends the signals to a receiver coupled to an electronic device having a display.

Figure 3:
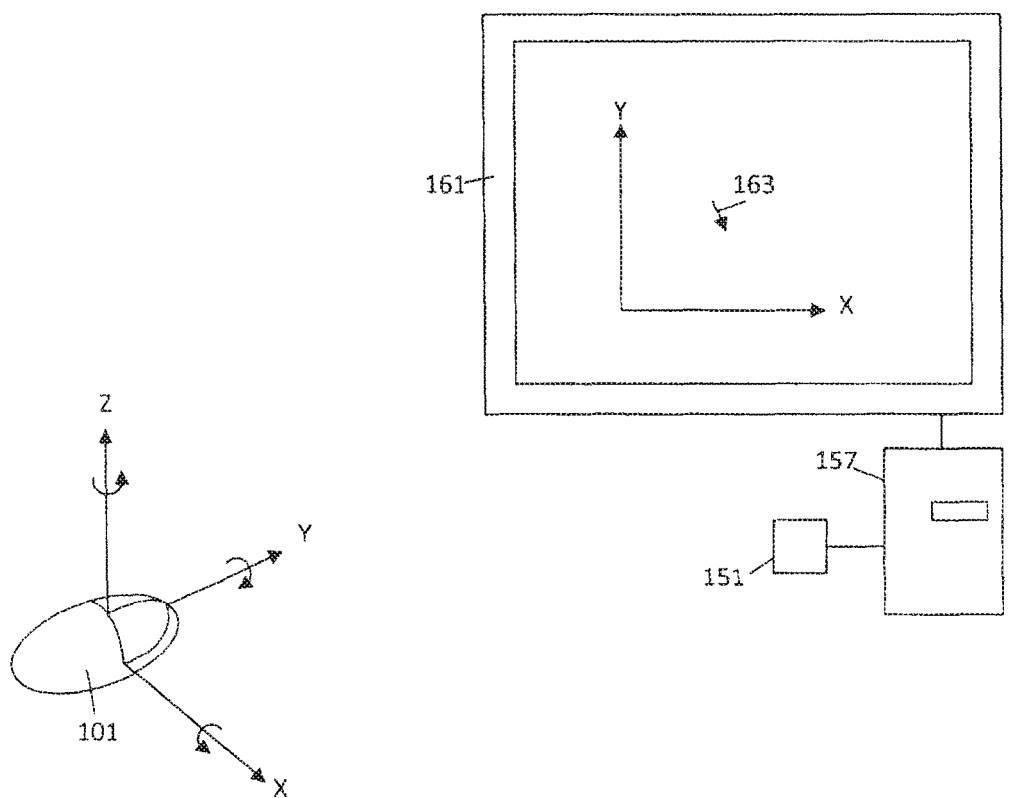
FIG. 3 illustrates a pointing device used with an electronic device having a visual display.

With reference to FIG. 3, the pointing device 101 detects movement and transmits cursor control signals to a receiver 151 that is coupled to an electronic device 157 having a visual display 161. The visual display 161 has an X and Y axis coordinate system which are used describe the position and movement of the cursor 163 on the visual display 161 which is known as the "user frame of reference." Rotation of the pointing device 101 about the X axis 105 causes movement of the cursor 163 in the vertical Y direction of the visual display 161 and rotation about the Z axis 109 causes horizontal X movement of the cursor 163. The speed of the cursor 163 movement is proportional to the magnitude of the rotational velocities. Thus, when rotation of the pointing device 101 is stopped, the cursor 163 movement also stopped. In order to properly coordinate the movements of the pointing device 101 and the cursor 163 movement on the display 161 screen, a scaling process can be applied to the cursor 163 movement signals. Although movement control signals for a cursor 163 are described, in other embodiments, the inventive system and method can be used to control the movement of any other type of object or marker on any type of visual display.

Figure 4:
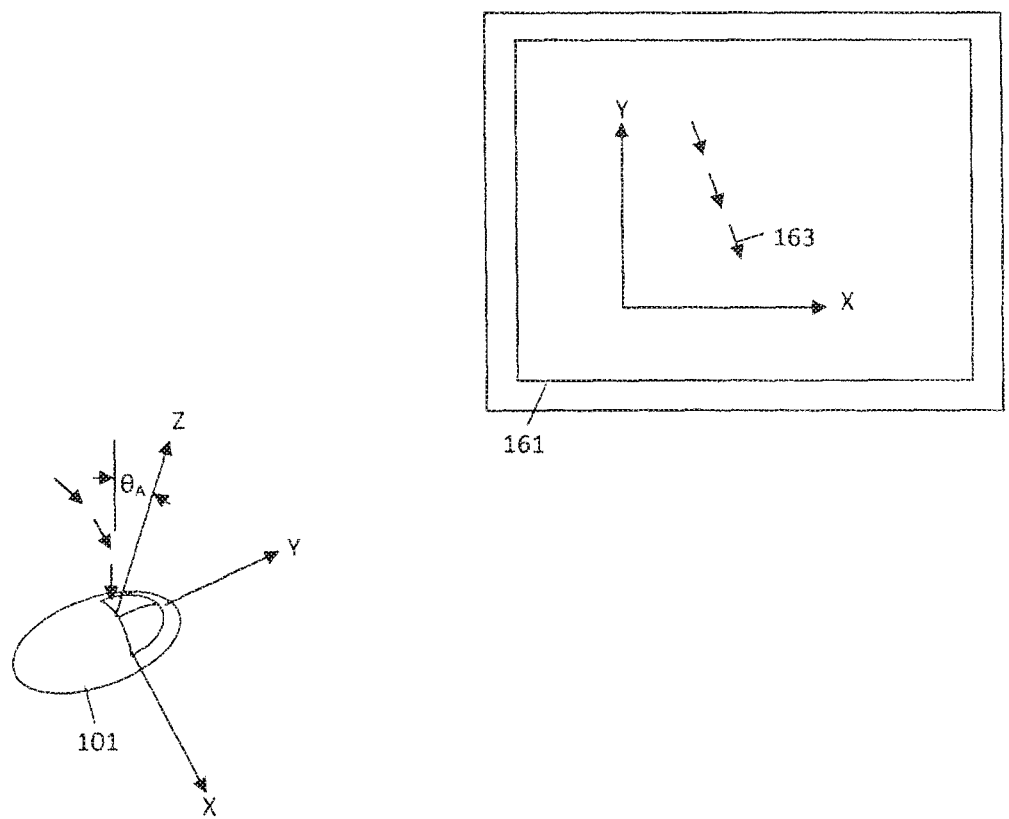
FIG. 4 illustrates a pointing device that does not have roll compensation and a visual display.

As discussed in the background, people naturally hold objects at a slight roll angle about the Y axis rather than in a perfectly horizontal orientation. When a pointing device that does not provide roll compensation is held at an angle, the accelerometers and gyroscopes within the pointing device are all offset by the roll angle relative to the ground. This roll angle causes the outputs of the accelerometers and gyroscopes in the pointing device to be offset by the roll angle. With reference to FIG. 4, if the pointing device 101 is held at a roll angle θA and moved in rotation about a horizontal axis, both the X axis gyroscope and the Z axis gyroscope will detect rotational velocities and the cursor 163 will move at an angle in the X and Y directions rather than only in a Y vertical direction of the visual display 161.

Figure 5:
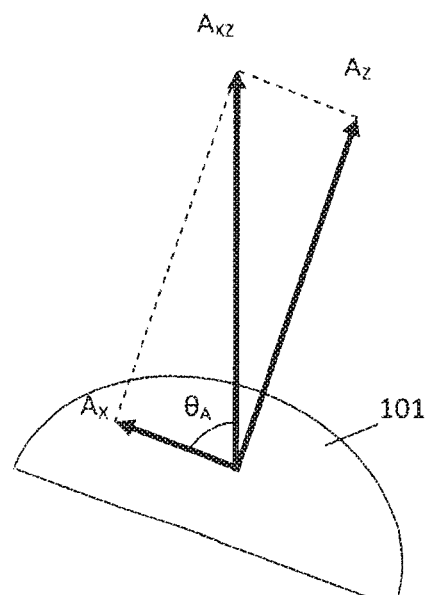
FIG. 5 illustrates a pointing device at a roll angle with acceleration signals AX and AZ graphically illustrated.

In order to solve this problem, the inventive pointing device provides roll compensate so that the cursor will move based upon the movement of the pointing device regardless of the roll angle that the user holds the pointing device. With reference to FIG. 5, if the pointing device 101 is held at a roll angle θA, the X and Z direction accelerometers will both detect some of the gravitational acceleration and emit acceleration signals AX and AZ. By comparing the magnitudes of the acceleration signals AX and AZ components, the roll angle θA of the pointing device 101 can be calculated by the equation θA=arctan (AX/AZ). Another value required for the roll compensation calculation is the vector sum of AX and AZ which is defined by the equation AXZ=[AX2=AZ2]½.

Figure 6:
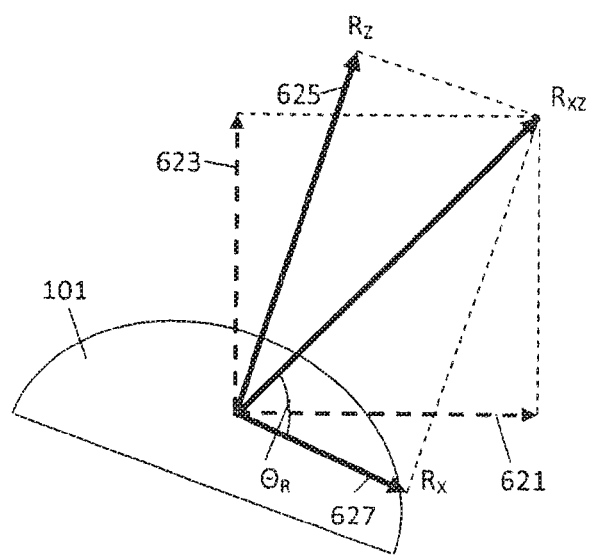
FIG. 6 illustrates a pointing device at a roll angle with rotational velocity signals RX and RZ graphically illustrated.

The roll angle θA of the pointing device also alters the rotational velocity outputs RX and RZ from the X axis and X axis gyroscopes. The angle formed by magnitudes of the RX and RZ rotational components is represented by θR. Like roll angle θA, the rotational component angle θR is calculated by the equation θR=arctan (RX/RZ). The vector sum of RX and RZ rotation components is calculated by the equation, RXZ=(RX2+RZ2)½. With reference to FIG. 6, if the pointing device 101 is moved in rotation diagonally, with equal rotational velocities up in pitch and counter clockwise in yaw, the pointing device should emit a RX rotation signal 621 and a RZ rotation signal 623 that are equal in magnitude. However, the roll of the pointing device causes the magnitudes to be shifted which increases the RZ rotation 625 and decreases the RX rotation 627 while the vector sum RXZ remains constant.

The basic roll compensation equations for Xcomp and Ycomp for the inventive pointing device are used to provide roll correct the X and Y motion signals for a cursor on a visual display. The Xcomp and Ycomp correction factors are based upon the vector sum of the rotational velocities, RXZ and the sin and cos of the sum of the angle of the acceleration components $\theta_A$ and angle of the rotational velocity components $\theta_R$. The basic roll compensation equations are:

$$X_{comp}=R_{XZ}*\sin(\theta_A+\theta_R)$$

$$Y_{comp}=R_{XZ}*\cos(\theta_A+\theta_R)$$

While it is possible to calculate the sin and cos of $(\theta_A+\theta_R)$, these trigonometry calculations are fairly difficult and requires a substantial amount of processing power. Thus, a pointing device performing this calculation requires a powerful microprocessor and a larger power supply to operate the microprocessor. In order to create a more efficient roll compensation pointing device, the sin and cos functions are simplified. The basic $X_{comp}$ and $Y_{comp}$ equations are converted into the equivalent equations below:

$$\sin(\theta_A+\theta_R)=\sin(\theta_A)*\cos(\theta_R)+\cos(\theta_A)*\sin(\theta_R)$$

$$\cos(\theta_A+\theta_R)=\cos(\theta_A)*\cos(\theta_R)-\sin(\theta_A)*\sin(\theta_R)$$

With reference to FIG. 5, the sin and cos functions represent the geometric relationship of a right triangle. In an example, the perpendicular sides of the right triangle are represented by the magnitudes of $A_x$ and $A_z$. The length of the third side is $A_{XZ}$ which equals $[A_x^2+A_z^2]^{1/2}$. The angle $\theta_A$ is between the sides $A_X$ and $A_{XZ}$. The sin and cos functions can be replaced by the triangular ratios: sin $\theta_A=A_Z/A_{XZ}$, cos $\theta_A=A_X/A_{XZ}$, sin $\theta_R=R_Z/R_{XZ}$ and cos $\theta_R=R_X/R_{XZ}$. By substituting these sin and cos equivalents into the $X_{comp}$ and $Y_{comp}$ equations, the simplified $X_{comp}$ and $Y_{comp}$ equations become:

$$X_{comp}=R_{XZ}*[A_z/A_{XZ}*R_x/R_{XZ}+A_x/A_{XZ}*R_z/R_{XZ}]$$

$$Y_{comp}=R_{XZ}*[A_x/A_{XZ}*R_x/R_{XZ}-A_z/A_{XZ}*R_z/R_{XZ}]$$

The equations are further simplified to:

$$X_{comp}=[A_z*R_x+A_x*R_z]/A_{XZ}$$

$$Y_{comp}=[A_x*R_x-A_z*R_z]/A_{XZ}$$

The simplified roll compensation algorithm provides several benefits. By using these purely algebraic algorithms for the roll compensation cursor signals, $X_{comp}$ and $Y_{comp}$, are calculated with greatly reduced computational requirements and greatly reduces the energy required to perform the calculations. A low powered processor can be used which consumes very little electrical power and allows the pointing device to operate for much longer periods of time with portable batteries, extending the battery life between recharging or replacement. The low powered processor is also a much less expensive component than higher powered processors. Thus, the cost of production of the inventive pointing device can be significantly reduced. In sum, the inventive algebraic based roll compensating pointing device has many benefits over a pointing device that uses a trigonometry based roll compensation algorithm.

When the inventive pointing device is used, the algebraic $X_{comp}$ and $Y_{comp}$ algorithms are constantly being calculated to respond to all detected movement. In order to respond immediately to all intended movements, the motion sensors are constantly sampled and the values of $A_X$, $A_Z$, $R_X$ and $R_Z$ are constantly updated. This sampling may occur when the pointing device is moving and stationary. In an embodiment, the accelerometers and rotation sensors are sampled about once every 2 milliseconds. Because sensor reading error can occur, the system may include a mechanism for eliminating suspect data points. In an embodiment, the system utilizes a sampling system in which four readings are obtained for each sensor and the high and low values are discarded. The two middle sensor readings for $A_X$, $A_Y$, $A_Z$, $R_X$ and $R_Z$ are then averaged and forwarded to the processor to calculate $X_{comp}$ and $Y_{comp}$. Since the $X_{comp}$ and $Y_{comp}$ calculations are performed once for every four sensor readings, the report time for the sensors can be approximately every 8 milliseconds.

While the basic roll compensation correction system and method has been described above, additional adjustment can be applied to the inventive pointing device to further correct potential errors in the $X_{comp}$ and $Y_{comp}$ cursor control signals. In an embodiment, the) $X_{comp}$ value is corrected for the pitch of the pointing device. As the pointing device is rotated away from a horizontal orientation in pitch, the Z axis rotational sensor is angled away from a vertical orientation and detected Z axis rotational velocity $R_Z$ is reduced. In order to correct the) $X_{comp}$ value for pitch, the correction factor $A_{XYZ}/A_{XZ}$ is applied. Where $A_{XYZ}=[A_X^2+A_Y^2+A_Z^2]^{1/2}$ and $A_{XZ}=[A_X^2+A_Z^2]^{1/2}$. Since $A_Y$ is aligned horizontally, the gravitational force is small and $A_{XYZ}/A_{XZ}$ is approximately 1.0 when the pointing device is horizontal. The $A_Y$ signal will increase as the pointing device is rotated in pitch away from horizontal so $A_{XYZ}/A_{XZ}$ will also increase in value with increased pitch. The pitch correction is applied to $X_{comp}$ in the equations below:

$$X_{comp}=[A_z*R_x+A_x*R_z]/A_{XZ}*[A_{XYZ}/A_{XZ}]$$

In contrast to the pitch correction for the $Y_{comp}$, a correction factor is not required for $Y_{comp}$. The X axis rotational sensor is aligned with the X axis and detects the pitch rotational velocity about the X axis. Thus, $Y_{comp}$ is not reduced when the pointing device is moved in pitch. Since pitch does not alter $Y_{comp}$ the pitch correction is not applied to $Y_{comp}$.

Another correction that can be applied to the pointing device is correction for user induced rotational acceleration that can be detected by the accelerometers. Because the accelerometers are not located precisely at the center of the pointing device, rotation of the pointing device causes user induced acceleration that is detected by the accelerometers and results in errors in the accelerometer output signals $A_X$, $A_Y$ and $A_Z$. The user induced acceleration can include rotational acceleration and centripetal acceleration. By dynamically detecting and calculating these accelerations, the inventive system can remove the user induced accelerations by applying correction factors to output signals $A_X$, $A_Y$ and $A_Z$. The gravitational force detected by the accelerometers can then be isolated, resulting in a more accurate roll compensation calculation.

The rotational acceleration is detected by the accelerometers when there is a change in the rotational velocity of the pointing device. Since the accelerometers are not located at the center of rotation of the pointing device, any rotational acceleration will cause linear acceleration of the accelerometers based on the equation, $A=\Delta R/\Delta time*1$. The rotational acceleration is $\Delta R/\Delta time$ and can be determined by detecting the difference in velocity between each rotational sensor sample and dividing this difference by the sample time. The fulcrum arm length 1, can each be different for each of the X, Y and Z accelerometers and may be represented by $l_X$, $l_Y$ and $l_Z$ respectively. Since the X, Y and Z accelerometers only detect acceleration in one direction, the fulcrum arm lengths are the distances between the accelerometer and an axis of rotation that is perpendicular to the detection direction.

Figure 7:
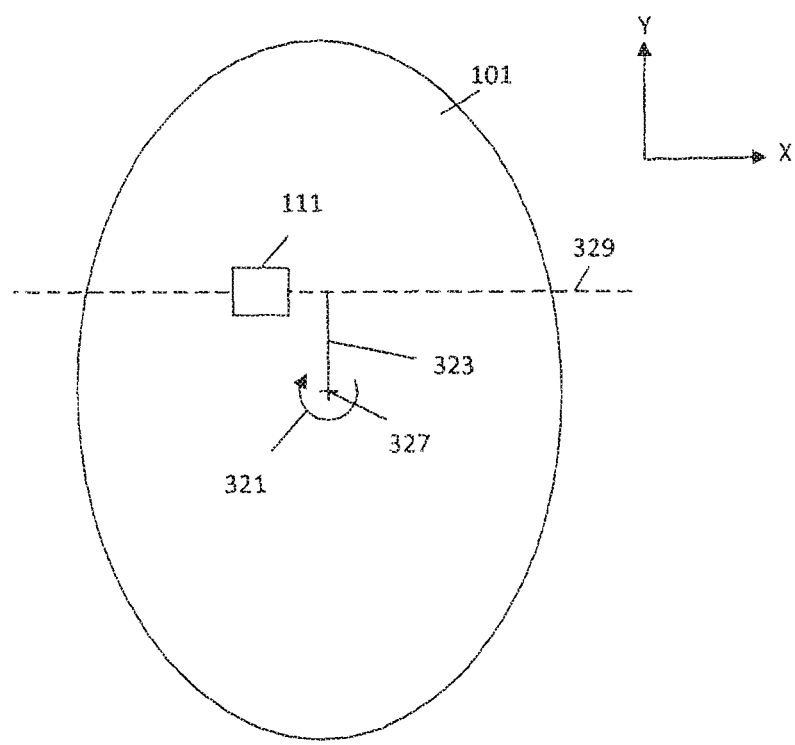
FIG. 7 illustrates a cross section top view of the pointing device.

With reference to FIG. 7, a top view of the pointing device 101 is shown. The linear acceleration of the X direction accelerometer 111 is calculated by multiplying the rotational acceleration 321 of the pointing device 101 about the Z axis by the length lX 323 of the fulcrum arm. The fulcrum arm length lX 323 is equal to the perpendicular length from the Z axis 327 to a line 329 passing through the X direction accelerometer 111 in the X direction. Note that the length lX 323 is perpendicular to both the line 329 and the Z axis 327. Similarly, the linear acceleration of the Z direction accelerometer is the rotational acceleration of the pointing device about the X axis multiplied by the fulcrum arm length lZ, which is the perpendicular length from the X axis to a line passing through the Z direction accelerometer in the Z direction. In some cases, it can be difficult to determine the exact fulcrum arm lengths lX and lZ, and approximate lengths can be used to calculate rotational acceleration. In an embodiment, the user induced rotational acceleration is subtracted from the detected acceleration based upon the equations:

$$A_{Xcorrected}=A_X-\Delta R_Z/\Delta time*l_X$$

$$A_{Zcorrected}=A_Z-\Delta R_X/\Delta time*l_Z$$

These calculations do not account for rotation about the Y axis because the inventive pointing device may not include a Y axis rotational sensor. However, since $R_Y$ is likely to be 0, then $\Delta R_Y/\Delta time=0$ and the effects of Y axis rotational acceleration are negligible and not necessary for the $A_{Xcorrected}$ and $A_{Zcorrected}$ calculations. It is also possible to calculation $A_{Ycorrected}=A_Y-\Delta R_X/\Delta time*l_{Y1}-\Delta R_Z/\Delta time*l_{Y2}$, where $l_{Y1}$ is the perpendicular length from the X axis to a line passing through the Y direction accelerometer in the Y direction and $l_{Y2}$ is the perpendicular length from the Z axis to the line passing through the Y direction accelerometer in the Y direction. Since the $A_Y$ is only used in the pitch correction calculations and likely to be small in magnitude, the $A_{Ycorrected}$ calculation may not have a significant influence on the $X_{comp}$ and $Y_{comp}$ calculations and may not be required.

The values of $A_X$, $A_Y$ and $A_Z$ can also be altered by centripetal acceleration due to the offset of the accelerometers from the center of rotation. The centripetal calculations are based around the equation $A_{centripetal}=R^2*radius$. The value of "r" is the offset distance of the accelerometer about the axis of rotation. The centripetal acceleration can have two separate components. For Example, the centripetal accelerations of the Y accelerometer can be caused by rotation $R_X^2$ and $R_Z^2$. The radius is the distance of the accelerometer from the axis of rotation. In an embodiment, the centripetal accelerations are calculated and used to correct the $X_{comp}$ and $Y_{comp}$ calculations. However, in general, the centripetal acceleration will be very small in comparison to the rotational acceleration and can be omitted from the accelerometer correction equations.

Another factor that can alter the output of the accelerometers and rotations sensors is temperature. With reference to FIG. 2, a block diagram of the pointing device components is illustrated. In order to compensate for the effects of temperature, the pointing device can have a temperature sensor 217 that provides a temperature signal to the processor 205. The detected temperature can be stored in memory 219 and a corresponding temperature correction factor can be applied to the outputs of the rotational sensors, $R_X$ and $R_Z$. The processor 205 can be configured to check the temperature periodically and if the temperature has changed significantly from the stored temperature, a new temperature correction factor can be applied to the rotation velocity signals. In an embodiment, the temperature is checked every 5 minutes and a new temperature correction value is applied when the temperature has changed by more than 2 degree Centigrade.

In order to minimize the required temperature correction factors, the inventive motion detection system can be designed with paired components that have an inverse reaction to temperature. For example, the rotational velocity output signals from the rotational sensors may increase as the temperature increases. These rotational sensors may be paired with regulators that decrease the rotational output readings with increases in temperature. Since these paired components have an opposite effect on the signal, the net effect of temperature variations on the output rotational signals is reduced. While a temperature correction may still be required, the influence of temperature changes is reduced which makes the system more stable.

The inventive pointing device may also automatically perform sensor calibration. During the operation of the pointing device, the system may detect when the accelerometers $A_X$ and $A_Z$ are producing a steady output which indicates that the pointing device is stationary. During this time, the outputs of the gyroscopes $R_X$ and $R_Z$ should be zero since the pointing device is not in rotation. In an embodiment, the inventive pointing device may perform a calibration process to correct any rotational $R_X$ and $R_Z$ output errors. These correction offsets can be stored in memory 219 and used to adjust the outputs of the rotational sensors until the calibration process is performed again.

Since the correction factors are calculated using a very simple algebraic algorithm, a basic processor that requires very little electrical energy can be used. In an embodiment, the inventive roll compensation pointing device uses a 16 bit RISC (Reduced Instruction Set Computer) processor that operates at about 4 MHz. Commonly available consumer batteries such as one or more 1.5 Volt AA or AAA sized batteries can power the inventive pointing device for several months or longer without recharging. This is a significant improvement over a pointing device that uses a trigonometry based roll compensating algorithm that requires a more powerful processor operating at 12-16 MHz, consumes much more energy and may require more frequent recharging or replacement of batteries.

In other embodiments, the pointing device can include additional energy saving features. When the pointing device 101 is not being used, it can be automatically switched off or placed in low energy consumption stand-by mode. In an embodiment, the processor of the pointing device may detect that the accelerometers are emitting steady output signals and/or the rotational sensors are emitting zero rotational velocity signals. If these sensor outputs remain for an extended period of time, the processor may cause the pointing device to be shut off or go into a sleep mode. In order to restart the pointing device, the user may have to press a button on the pointing device or the pointing device may detect movement. In response, the processor may apply power to the pointing device components. Since the accelerometers and gyroscopes only require about 250 milliseconds to become operational, the delay in response may be insignificant and unnoticed by the user.

Though the foregoing invention has been described in detail for purposes of clarity of understanding, it will be apparent that various changes and modifications may be practiced within the scope of the appended claims. It is therefore intended that the following appended claims be interpreted as including all such alterations, permutations, and equivalents as fall within the spirit and scope of the present invention.

What is claimed is:

1. A pointing device for controlling movement of a cursor on an electronic display comprising:
a first rotational sensor providing a first rotational velocity signal $R_X$ for rotational movement about a first axis;
a second rotational sensor providing a second rotational velocity signal $R_Z$ for rotational movement about a second axis;
a first accelerometer providing a first acceleration signal $A_X$ in response to an acceleration in a first direction along the first axis;
a second accelerometer providing a second acceleration signal $A_Z$ in response to an acceleration in a second direction along the second axis;
a third accelerometer providing a third acceleration signal $A_Y$ in response to an acceleration in a third direction along a third axis,
a processing unit that calculates from $R_X$, $R_Z$, $A_X$, $A_Y$ and $A_Z$ both a first vertical cursor movement signal compensated for roll angle and a second horizontal cursor movement signal compensated for roll angle so that the cursor's direction is made independent of the roll angle of the pointing device,
wherein the second horizontal cursor movement signal is further compensated for pitch angle so that the horizontal displacement of the cursor is made independent of the pitch angle of the pointing device,
wherein vertical and horizontal directions are determined in reference to the electronic display frame,
and wherein the processing unit calculates a vector sum $A_{XZ}$ of $A_X$ and $A_Z$, and calculates cursor movement signals compensated for roll angle $X_{comp}$ and $Y_{comp}$ with the equations:

$$X_{comp}=[A_Z*R_X+A_X*R_Z]/A_{XZ};\text{ and}$$

$$Y_{comp}=[A_X*R_X-A_Z*R_Z]/A_{XZ}.$$

2. A pointing device for controlling movement of a cursor on an electronic display comprising:
a first rotational sensor providing a first rotational velocity signal $R_X$ for rotational movement about a first axis;
a second rotational sensor providing a second rotational velocity signal $R_Z$ for rotational movement about a second axis;
a first accelerometer providing a first acceleration signal $A_X$ in response to an acceleration in a first direction along the first axis;
a second accelerometer providing a second acceleration signal $A_Z$ in response to an acceleration in a second direction along the second axis;
a third accelerometer providing a third acceleration signal $A_Y$ in response to an acceleration in a third direction along a third axis; and
a processing unit that calculates, from $R_X$, $R_Z$, $A_X$, $A_Y$ and $A_Z$, first cursor movement signals $X_{comp}$ and $Y_{comp}$ compensated for roll angle, and wherein signal $X_{comp}$ is further compensated for pitch angle of the device as $X_{comp\ corrected}$;
wherein the processing unit calculates $X_{comp\ corrected}$, the further compensation of roll compensated cursor movement signal $X_{comp}$, for pitch angle of the device with the equation $X_{comp\ corrected}=X_{comp}/\cos(\text{Pitch})$, where Pitch is the pitch angle of the device.

3. A pointing device for controlling movement of a cursor on an electronic display comprising:
a first rotational sensor providing a first rotational velocity signal $R_X$ for rotational movement about a first axis;
a second rotational sensor providing a second rotational velocity signal $R_Z$ for rotational movement about a second axis;
a first accelerometer providing a first acceleration signal $A_X$ in response to an acceleration in a first direction along the first axis;
a second accelerometer providing a second acceleration signal $A_Z$ in response to an acceleration in a second direction along the second axis;
a third accelerometer providing a third acceleration signal $A_Y$ in response to an acceleration in a third direction along a third axis; and
a processing unit that calculates, from $R_X$, $R_Z$, $A_X$, $A_Y$ and $A_Z$, first cursor movement signals $X_{comp}$ and $Y_{comp}$ compensated for roll angle, and wherein signal $X_{comp}$ is further compensated for pitch angle of the device as $X_{comp\ corrected}$;
wherein the processing unit calculates a vector sum $A_{XZ}$ of $A_X$ and $A_Z$, a vector sum $A_{XYZ}$ of $A_X$, $A_Y$ and $A_Z$, and wherein $X_{comp\ corrected}$, the further compensation of roll compensated cursor movement signal $X_{comp}$ for pitch angle of the device, is calculated with the equation $X_{comp\ corrected}=X_{Comp}*[A_{XYZ}/A_{XZ}]$.

4. A pointing device for controlling movement of a cursor on an electronic display comprising:
a first rotational sensor providing a first rotational velocity signal $R_X$ for rotational movement about a first axis;

a second rotational sensor providing a second rotational velocity signal $R_Z$ for rotational movement about a second axis;

a first accelerometer providing a first acceleration signal $A_X$ in response to an acceleration in a first direction along the first axis;

a second accelerometer providing a second acceleration signal $A_Z$ in response to an acceleration in a second direction along the second axis;

a third accelerometer providing a third acceleration signal $A_Y$ in response to an acceleration in a third direction along a third axis; and a processing unit that calculates, from $R_X$, $R_Z$, $A_X$, $A_Y$ and $A_Z$, first cursor movement signals $X_{comp}$ and $Y_{comp}$ compensated for roll angle, and wherein signal $X_{comp}$ is further compensated for pitch angle of the device as $X_{comp\ corrected}$;

wherein the processing unit calculates a vector sum $A_{XZ}$ of $A_X$ and $A_Z$, a vector sum $A_{XYZ}$ of $A_X$, $A_Y$ and $A_Z$, and roll and pitch compensated cursor movement signal $X_{comp\ corrected}$ and roll compensated cursor movement signal $X_{comp}$ with the equations:

$$X_{comp\ corrected} = [A_Z * R_X + A_X * R_Z]/A_{XZ} * [A_{XYZ}/A_{XZ}]; \text{ and}$$

$$Y_{comp} = [A_X * R_X - A_Z * R_Z]/A_{XZ}.$$

* * * * *